Patented Feb. 22, 1949

2,462,354

UNITED STATES PATENT OFFICE 2,462,354

ORGANIC COMPOUND POLYMERIZATION PROCESS

Merlin M. Brubaker, Delaware County, and Ralph A. Jacobson, Landenburg, Pa., assignors to E. I. du Pont de Nemours & Company, Wilmington, Del., a corporation of Delaware No Drawing. Application September 17, 1942, Serial No. 458,734

17 Claims. (Cl. 260—87)

1

This invention relates to polymeric materials, and more particularly it relates to a process for their production. More specifically this invention relates to a new and improved process for the polymerization of polymerizable organic compounds containing at least one ethylenic double bond, including copolymerization reactions.

Within recent years the plastics industry has utilized a wide variety of polymeric materials in the production or manufacture of a wide variety of valuable commercial articles. Rapid progress has been made on the important problem of developing improved techniques for the preparation of these plastics. Nevertheless, the polymerization of ethylenic compounds according to methods disclosed in the art is often a slow, uneconomical process, which cannot be applied efficiently to manufacture on a large commercial scale. As a result, many polymerization products having attractive properties have been produced in the laboratory but have never reached commercialization because of the lack of suitable methods for their production. Moreover, some of the most valuable plastics of this class are not based on a single monomeric component but are rather produced by the copolymerization of 2 or even more polymerizable monomers. In this case, the problem of obtaining satisfactory products is further complicated by difficulties in obtaining homogeneous products. For example, the copolymerization of different ethylenic monomers frequently proceeds at different rates; hence nonhomogeneous products of inferior quality as evidenced by opacity, low softening point, or other undesirable qualities are obtained. This invention, which provides a novel, efficient, and practical process for overcoming the difficulties attending known polymerization techniques, accordingly represents an important advance in the art of producing plastics.

This invention has as its object to provide an improved process for the polymerizing of polymerizable organic compounds having at least one ethylenic linkage and having a molecular weight in excess of 30. Another object is to provide an extremely rapid polymerization reaction for the polymerization of such compounds, either alone or in admixture with other polymerizable compounds' Another object is to produce new and improved synthetic plastics. Other objects will be apparent from the following description of the invention.

These objects are accomplished by the following invention which comprises polymerizing a polymerizable organic compound having at least one ethylenic linkage and having a molecular weight in excess of 30 by bringing same into contact with an oxygen-yielding catalyst and an oxidizable sulfoxy compound while dispersed in water for a sufficient length of time to bring about essentially complete conversion to the corresponding polymeric product. This process includes the polymerizing of either a single compound or mixtures of such compounds.

In the practice of this invention valuable polymers are produced according to the following preferred procedure. An aqueous medium containing about 0.1 to 2% of an oxygen-liberating catalyst such as hydrogen peroxide, benzoyl peroxide, or a soluble salt of perdisulfuric acid, about 0.05 to 0.5% of an oxidizable oxygen-containing sulfur compound, such as sodium bisulfite, and about 1 to 5% of a suitable dispersing agent is charged into a reaction vessel provided with means for effective agitation. To this mixture is added a polymerizable ethylenic compound or mixture of ethylenic compounds. The reaction vessel is closed, the air in the free space above the liquid is displaced by an inert gas such as nitrogen and the temperature of the reaction mixture is adjusted to an appropriate value between 0° and approximately 125° C. These conditions are maintained until polymerization is essentially complete, usually in the neighborhood of 1 to 5 hours. The resulting dispersion is then transferred to a suitable open vessel, traces of unreacted monomers are removed by steam distillation, and the polymeric product is coagulated by adding a solution of an electrolyte such as aluminum sulfate. The coagulated product is filtered, thoroughly washed to remove traces of impurities and residual dispersing agent and finally dried.

The preferred embodiments of the invention are illustrated by the following examples in which proportions of reactants are given in parts by weight unless otherwise stated.

EXAMPLE I

A solution containing 7.8 parts of a commercial dispersing agent having 22% of sodium cetyl-sulfate as the active ingredient in 111 parts of water is prepared by warming on the steam bath. To the clear solution in a closed reaction vessel is added 60 parts of vinyl acetate and after cooling to approximately room temperature, 0.6 part of ammonium perdisulfate and 0.2 part of sodium bisulfite. The free space in the reaction vessel is thoroughly flushed with nitrogen to remove air, and the temperature of the liquid dispersion is increased to approximately 45° C. Heating at this temperature with efficient agitation is continued for approximately 5 hours. The vessel is then opened, the dispersion is diluted with approximately an equal volume of water, and steam is passed in to remove traces of unreacted monomer. The resulting dispersion is cooled to 40° C. and 20 parts of 10% aluminum sulfate solution added with stirring to bring about complete coagulation of the polymerized vinyl acetate. The product is filtered, washed thoroughly with water and dried. There is obtained 58.5 parts of high quality polyvinyl acetate, which corresponds to a yield of 97.5% of theory.

EXAMPLE II

A unit for the continuous preparation of polyvinyl chloride is constructed as follows: A jacketed stainless steel reservoir is provided with an inlet tube for charging vinyl chloride, a second inlet for charging aqueous components, a pressure gauge, and a pipe line leading from the bottom of the vessel to a high speed centrifugal pump at the top. This system is designed to circulate the entire contents of the reservoir to facilitate keeping the vinyl chloride uniformly mixed with the aqueous phase. Near the discharge orifice of the pump and below the liquid level a conduit is provided which leads to a stainless steel coil immersed in a water bath maintained at 40° C. This stainless steel coil is provided with suitable connections so that the entire contents of the coil, or a major portion thereof, can be recirculated at high speed through a second centrifugal pump. The end of the coil is closed with a valve. All of this unit which may be exposed to vinyl chloride is preferably constructed of stainless steel. This unit is operated as follows: A mixture of 5.5 parts of vinyl chloride, 27.5 parts of water, 0.028 part of ammonium perdisulfate, and 0.028 part of sodium bisulfite is charged into the stainless steel mixing vessel. Water at 0° C. is circulated through the water jacket and the contents of the vessel are rapidly agitated by the centrifugal pump system referred to above. When a uniform dispersion has been produced, the valve at the end of the stainless steel coil is opened and the aqueous monomer emulsion from the reservoir is drawn into the coil, its connections, and recirculating pump. When liquid appears at the valve, the system is closed and the charge in the coil is circulated at high speed for approximately 15 minutes. The valve is then opened slightly, and the water suspension of polyvinyl chloride withdrawn at such a rate as to avoid the loss of any monomeric vinyl chloride. In order to prevent volatilization of monomer in the coil during the recirculation process, it is desirable to conduct the entire operation under a nitrogen pressure of approximately 180 lbs./sq. in. Under these conditions the unit operates satisfactorily and polyvinyl chloride suspension can be withdrawn continuously from the coil with essentially complete conversion of the vinyl monomers.

EXAMPLE III

The process of this invention is adapted to the production of a wide variety of copolymers of vinyl chloride, which are produced in high yields by the following procedure. A solution comprising 1600 parts of water and 96 parts of a commercial dispersing agent containing about 32% of the sodium salt of sulfonated paraffin white oil as the active ingredient, 4.25 parts of ammonium perdisulfate, and 1.6 parts of sodium bisulfite is charged into a stainless steel polymerization vessel equipped with an efficient anchor-type stirrer, closure, and inlet and discharge orifices. The pH of the solution is then adjusted to 2.4 with dilute sulfuric acid. A mixture of approximately 800 parts of vinyl chloride with another interpolymerizable component, as listed in the following table, is then charged into the vessel, the free space is flushed with nitrogen to remove air, and the vessel is sealed. The resulting dispersion is agitated vigorously at 40° C. for a period of 2 hours. The resulting dispersion is transferred to an open tank, diluted with an equal volume of water, and heated to a temperature of approximately 85° C. The copolymer is then coagulated by adding with vigorous stirring 80 parts of 10% aluminum sulfate solution. Heating is continued for a short time and the polymer is filtered and washed thoroughly with warm water until substantially free from all residual catalyst and dispersant. The filter cake is then slurried with 0.5% sodium hydroxide solution, refiltered, and finally washed with methanol and dries to constant weight.

The preparation of typical vinyl chloride copolymers by this procedure is shown in the following table.

| Number | Composition of Monomer Component | Time, Hrs. | Yield, percent |
|---|---|---|---|
| 1 | 90 Vinyl chloride:10 vinyl acetate | 2 | 90 |
| 2 | 76 Vinyl chloride:24 methyl acrylate | 2 | 95 |
| 3 | 90 Vinyl chloride:10 asym.-dichloroethylene | 2 | 84 |
| 4 | 94.3 Vinyl chloride:5.7 Diethyl fumarate | 2 | 93 |
| 5 | 79 Vinyl chloride:10.5 vinyl acetate:10.5 dimethyl fumarate | 2 | 89 |
| 6 | 98.8 Vinyl chloride:1.2 trichloroethylene | 3 | 98 |

EXAMPLE IV

The following runs illustrate the remarkable speed of polymerization which results from using the process of this invention in the copolymerization of vinyl chloride with diethyl fumarate. In each case the monomer mixture consists of 88 parts of vinyl chloride and 12 parts of diethyl fumarate. The aqueous monomer ratio in all cases is 2:1, the catalyst is ammonium perdisulfate, the oxidizable oxygen-containing sulfur adjuvant is sodium bisulfite and the dispersing agent is the sodium salt of sulfonated paraffin white oil as described in Example III. In the following table is shown the effect of variations in the amount of catalyst, adjuvant, and dispersing agent. Polymer yields are based on the dry weight of the product as isolated by the procedure described in Example III.

Vinyl chloride/diethyl fumarate (88:12) copolymers

| Run | Per Cent Catalyst | Per Cent Adjuvant | Per Cent Dispersant | Time, hrs. | Yield, Per Cent |
|---|---|---|---|---|---|
| 1 | 0 | 0.46 | 0 | 24 | 0 |
| 2 | 0 | 0.46 | 4 | 2 | 1 7 |
| 3 | 0.5 | 0 | 0 | 24 | 0 |
| 4 | 0.5 | 0.46 | 0 | 24 | 99 |
| 5 | 0.5 | 0.46 | 4 | 2 | 94 |
| 6 | 0.5 | 0.15 | 4 | 2 | 90 |
| 7 | 0.5 | 0.20 | 4 | 5 | 98 |
| 8 | 0.5 | 0 | 4 | 5 | 20 |
| 9 | 0 | 0 | 4 | 24 | 0 |

[1] Gummy—very low molecular weight—contains monomer.

The above data clearly illustrate the advantages of the process of this invention for the preparation of vinyl chloride copolymers.

EXAMPLE V

Seven and eight tenths parts of a commercial dispersing agent containing about 22% of sodium cetyl sulfate as the active ingredient is dissolved in 111 parts of water by warming on a steam bath. The clear solution is charged into a glass vessel and cooled to 4° C. Sixty parts of methyl methacrylate, 0.6 part of ammonium perdisulfate and 0.06 part of sodium bisulfite are then added. The air in the reaction vessel is then displaced with nitrogen. The liquid contents are thoroughly mixed and allowed to stand at 4° C. for 72 hours. The resulting dispersion is diluted with an equal volume of ice water, and 20 parts of a 10% solution of aluminum sulfate added. The coagulated polymeric product is filtered, washed and dried. There is obtained 55.3 parts which corresponds to a yield of 92.4% of theory. The softening temperature of the product is 108° C. and the molecular weight is about 446,000 as measured by the method of Staudinger.

According to the same procedure, isobutyl methacrylate can be polymerized to form a high molecular weight product.

In the absence of sodium bisulfite or similar oxidizable sulfoxy compounds coming within the scope of the invention, neither methyl methacrylate nor isobutyl methacrylate polymerize at an appreciable rate under the conditions disclosed above.

EXAMPLE VI

Thirty parts of methyl methacrylate, 3 parts of the dispersing agent of Example V, 0.74 part of sodium thiosulfate, 1.45 parts of 30% hydrogen peroxide solution and 0.1 part of sodium hydroxide are mixed with 50 parts of water in a glass reaction vessel at 30° C. A rapid rise in temperature from 30° C. to 43° C. occurs and the resulting dispersion is allowed to stand for approximately 30-40 minutes without agitation and without further heating. The mixture is then diluted with an equal volume of water and treated with 5 parts of 10% aluminum sulfate solution to bring about coagulation of the resulting polymethyl methacrylate. After filtering, washing and drying by conventional procedures there is obtained an essentially quantitative yield of polymethyl methacrylate polymer which is suitable for producing shaped articles by molding. In the absence of sodium thiosulfate, the polymerization of methyl methacrylate according to this process is extremely slow.

EXAMPLE VII

The following runs illustrate the application of the process of this invention to a series of selected methyl methacrylate copolymer systems. In each of these experiments 100 parts of monomer is dispersed in 200 parts of water containing appropriate amounts of benzoyl peroxide or ammonium perdisulfate as catalyst, and sodium bisulfite as activator. With the exception of experiment 4 approximately 3 parts of sodium cetyl sulfate is employed as dispersing agent. In experiment 4 there is employed 3 parts of neutral sodium polymethacrylate.

containing about 23% of the sodium salt of sulfonated cumar resin as the active ingredient; 0.6 part of ammonium perdisulfate; 0.5 part of ammonium bisulfite; 0.8 part of sodium dihydrogen phosphate. The pH of the solution is adjusted to 4.6 with dilute sulfuric acid and 100 parts is charged into a suitable reaction vessel with 50 parts of acrylonitrile. The air in the vessel is flushed with nitrogen and after sealing, the liquid contents are agitated at 40° C. for 2 hours. The mixture is cooled to room temperature, the resulting dispersion is diluted with an equal volume of distilled water and heated to approximately 85° C., and the polymer precipitated by adding with vigorous stirring 10 parts of 10% aluminum sulfate solution. Heating is continued for a short time and the polymer is filtered, thoroughly washed with warm water and dried. There is obtained 42.5 parts of high quality polyacrylonitrile which corresponds to a yield of 85% of theory.

EXAMPLE IX

Fifty parts of distilled water, 5 parts of acrylonitrile, 0.01 part of sodium bisulfite and 0.15 part of 100 volume hydrogen peroxide solution are mixed and allowed to stand at 25° C. with occasional agitation for 20 hours. On working up the product as described in Example VIII there is obtained essentially a quantitative yield of polyacrylonitrile. In control experiments in which the sodium bisulfite is omitted in one case and the hydrogen peroxide in another, there is no evidence of polymerization during a period ranging from 1 to 4 days at 25° C.

EXAMPLE X

A mixture of 50 parts of distilled water, 0.01 part of sodium bisulfite, 5 parts of acrylonitrile and 0.05 part of benzoyl peroxide is prepared as described in Example IX. On isolating the polymer after standing at room temperature (25° C.) for 20 hours there is obtained 5 parts of acrylonitrile polymer. A corresponding experiment in which the sodium bisulfite is omitted shows first evidence of polymerization only after the elapse of about 20 hours.

EXAMPLE XI

Twelve parts of acrylonitrile is mixed with 100 parts of water containing 0.1 part of ammonium perdisulfate and 0.02 part of sodium hydrosulfite ($Na_2S_2O_4$) and charged into a glass polymerization vessel. After sweeping the free space of the vessel with nitrogen, the charge is thoroughly mixed and allowed to stand with

*Methyl methacrylate polymers and copolymers*

| No. | Monomer Composition | Catalyst Concentration | Sodium Bisulfite Concentration | Time, Hrs. | Yield, Per Cent |
|---|---|---|---|---|---|
| 1 | 100 Methyl methacrylate | 0.5% $(NH_4)_2S_2O_8$ | 0.25 | 0.25 | 90 |
| 2 | 90 Methyl methacrylate: 10 chloropropene | do | 0.25 | 5 | 97 |
| 3 | 85 Methyl methacrylate: 15 vinyl acetate | 2% Benzoyl peroxide. | 0.5 | 1 | 92 |
| 4 | 70 Methyl methacrylate: 30 butadiene | 0.5% $(NH_4)_2S_2O_8$ | 0.25 | 6 | 90 |

EXAMPLE VIII

The following dispersing solution is prepared: 270 parts of water; 26 parts of a dispersing agent occasional agitation at 25° C. Samples taken at short intervals show that polymerization is well advanced after 20 minutes and is essentially complete within 1 hour. In a similar experiment carried out in the absence of sodium hydrosulfite, the first evidence of polymerization is observed only after 1 hour has elapsed.

Example XII

The following dispersing solution is prepared:

| | Parts |
|---|---|
| Water | 1360 |
| Dispersing agent containing about 98% active ingredient which consists mainly of the sodium salt of isopropylated naphthalene sulfonic acid | 29 |
| Ammonium perdisulfate | 1.2 |
| Sodium bisulfite | 0.5 |
| Sodium dihydrogen phosphate | 10 |

The pH of the solution is adjusted to 4.6 and the solution then placed in a suitable pressure vessel. After the introduction of 350 parts of vinyl acetate and 50 parts of acrylonitrile, the free space is flushed with nitrogen and the vessel sealed. The mixture is then heated at 36–40° C. with continuous stirring. Samples of the polymer dispersion are removed at various intervals for specific gravity determinations. Further quantities of acrylonitrile, ammonium perdisulfate, and sodium disulfite are added at the following specific gravities (25° C.):

| Specific Gravity 25° C. | Acrylonitrile, Parts | Ammonium Perdisulfate, Parts | Sodium Bisulfite, Parts |
|---|---|---|---|
| 0.998 | | 0.6 | 0.08 |
| 1.000 | 42.8 | | |
| 1.009 | 42.8 | | |
| 1.017 | 42.8 | | |
| 1.020 | | 0.6 | 0.32 |
| 1.023 | 42.8 | | |
| 1.036 | 42.8 | | |
| 1.042 | 42.8 | | |
| 1.046 | | 1.2 | 0.4 |
| 1.052 | 42.8 | | |

The entire polymerization requires 5 hours. The polymer is isolated as previously described and amounts to 600 parts or an 86% yield. The product is readily soluble in acetone. Fibers having good strength can be spun from the acetone solution by the dry or wet spinning process. Films having excellent appearance and attractive physical properties can be cast from acetone solution. The polymer can also be used in injection molding applications.

Example XIII

The following dispersing solution is made up:

| | Parts |
|---|---|
| Water | 685 |
| Dispersing agent described in Example XII | 14.5 |
| Ammonium perdisulfate | 3.0 |
| Sodium bisulfite | 1.8 |

A series of polymerization mixtures is introduced into polymerization vessels. Each mixture comprises 100 parts of the dispersing solution described above, 30 parts of acrylonitrile and 20 parts of the copolymerization ingredients listed below. The air in the polymerization vessels is then displaced with nitrogen, the vessels sealed and shaken for 2 hours at 40° C. The yield of polymer produced in each mixture is given in the table.

*Acrylonitrile/methacrylic ester copolymers (60/40)*

| Type | Per Cent Yield | Appearance |
|---|---|---|
| Acrylonitrile-ethyl methacrylate. | 98 | Clear, light colored, brittle. |
| Acrylonitrile-propyl methacrylate. | 96 | Clear, light colored, very brittle. |
| Acrylonitrile-butyl methacrylate. | 100 | Clear, yellow colored, brittle. |
| Acrylonitrile-isobutyl methacrylate. | 96 | Clear, very light yellow. |
| Acrylonitrile-methoxyethyl methacrylate. | 100 | Clear, light colored. |

Example XIV

Fifty parts of monomeric styrene is emulsified with 150 parts of water containing 1.25 parts of the sodium salt of sulfonated paraffin white oil, 0.2 part of ammonium perdisulfate, 0.2 part of sodium bisulfite and 1.0 part of disodium hydrogen phosphate. The emulsion is charged into a glass reaction vessel from which the air has been displaced by sweeping with nitrogen. After sealing the vessel, the liquid contents are agitated for 1 hour at 60° C., 1 hour at 80° C., and 1 hour at 100° C. and are finally cooled slowly for a period of 12–16 hours to a temperature of about 40° C. The dispersion is transferred from the polymerization vessel to a coagulation tank and the polymer precipitated by adding 50 parts of a solution containing 5% of magnesium chloride with rapid stirring. The styrene polymer is filtered and washed in a basket centrifuge and dried in a vacuum oven heated to a temperature in the neighborhood of 90° C. There is obtained a 98% yield of high molecular weight polymer, which is readily molded at 150° C. and 5000 pounds/sq. in. pressure for 5 minutes to give tough, clear, colorless, thermoplastic objects which soften at about 100° C.

Example XV

Forty-six parts of styrene monomer, 150 parts of water, 0.25 part of ammonium perdisulfate, 0.05 part of sodium bisulfite and 1.5 parts of the dispersing agent of Example XIV are charged into a glass reaction vessel. The free space in the vessel is thoroughly flushed with nitrogen to remove air and after sealing the vessel is rotated end over end for 1 hour in a water bath maintained at approximately 80° C. The temperature is raised to approximately 100° C. and the process repeated. The dispersion is removed, diluted with 1000 parts of water and the polymer isolated as described in Example XIV. The yield of dry product corresponds to 98% of theory based on the weight of styrene monomer originally employed.

Example XVI

Fifty-six parts of styrene, 135 parts of water, 0.1 part of ammonium perdisulfate, 0.2 part of ammonium bisulfite, 1.5 parts of the sodium salt of sulfonated white oil and 1.0 part of hydrated disodium hydrogen phosphate are charged into a glass-lined reaction vessel equipped with efficient anchor type stirrer, charging orifice, and reflux condenser. After displacing the air in the vessel with nitrogen, the emulsion is heated with efficient agitation for 1 hour at approximately 60° C., 1 hour at approximately 80° C. and 1 hour at approximately 100° C. The polymer is precipitated and dried in the manner described in Example XIV. There is obtained a 93% yield of high quality polystyrene suitable for the fabrication of a wide variety of useful molded objects.

In constrast to the rapid and effective polymerizations described in Examples XIV to XVI, the use of ammonium perdisulfate alone as the catalyst gives little evidence of polymerization during 18 hours at temperatures of 80–100° C. Similarly in polymerizations conducted at 60–100° C. with sodium bisulfite but in the absence of ammonium perdisulfate, the yield is only 50% after 6 hours. Other agents such as sodium hydrosulfite, sulfur dioxide, and the sodium bisulfite addition products of various aldehydes may be employed to increase the activity of ammonium perdisulfate catalyst.

EXAMPLE XVII

A solution of 1 part of N-vinyl phthalimide in 100 parts of methanol is prepared. To this solution is added a 5% aqueous ammonium perdisulfate solution containing 0.2% of sodium bisulfite in an amount just insufficient to bring about precipitation of the monomer. On standing overnight at room temperature a precipitate separates, and on working up by conventional procedures a substantially quantitative yield of polymeric N-vinyl phthalimide is obtained.

EXAMPLE XVIII

A solution of 0.5 part of ammonium perdisulfate and 0.25 part of sodium bisulfite is prepared in 100 parts of distilled water. To the mixture is added 3.0 parts of a commercial dispersing agent, which contains the sodium salt of isopropylated naphthalene sulfonic acid as the major active ingredient, and 50 parts of methyl vinyl ketone. The mixture is agitated gently at 35° C. for a period of 2 to 3 hours. On coagulating the dispersion with saturated brine, there is obtained 45 parts of polymethyl vinyl ketone.

EXAMPLE XIX

Ninety-two parts of asym.-dichloroethylene and 8 parts of acrylonitrile are emulsified in 300 parts of water containing 3 parts of a commercial dispersing agent having as its major active ingredient the sodium salt of sulfonated petroleum white oil, 0.5 part of sodium perdisulfate, and 0.2 part of sodium meta-bisulfite. The emulsion is charged into a corrosion-resistant, glass-lined vessel equipped with a means of agitation. The vessel is flushed with nitrogen and the liquid contents agitated gently at 45° C. for a period of 3 to 4 hours. The product is diluted with an equal volume of water and treated with saturated brine to bring about coagulation of the polymer. There is obtained 98 parts of asym.-dichloroethylene/acrylonitrile copolymer which is characterized by its insolubility in common organic solvents and which is capable of being pressed to flexible films and tough molded articles at elevated temperatures and pressures.

With other oxygen-yielding catalysts, such as benzoyl peroxide, similar results can be obtained provided the concentration of oxidizable sulfoxy adjuvant is adjusted to the appropriate range. In the absence of such adjuvants polymerization cycles ranging up to 20 hours are required for comparable results.

This invention provides an unusually rapid and effective method for accomplishing the polymerization, including copolymerization, of a wide variety of polymerizable ethylenic compounds of which those mentioned in the examples are typical.

The invention contemplates the production of valuable polymeric products from organic compounds containing at least 1 ethylenic linkage and having a molecular weight in excess of 30, and further characterized by the ability to undergo polymerization in the presence of oxygen-yielding catalysts or promoters. Representative compounds of this class are acrylic and methacrylic esters, acrylic and methacrylic acids, acrylonitrile, methacrylonitrile, acrylic and methacrylic amides, styrene, vinyl naphthalene, furylethylene, vinyl chloride, vinyl bromide, asym.-dichloroethylene, vinyl acetate and vinyl esters of higher carboxylic acids, methyl vinyl ketone, phenyl vinyl ketone, methyl isopropenyl ketone, esters of itaconic acid, methylenemalonic esters, N-vinylphthalimide, N-vinylsuccinimide, vinyl thiolacetate, methyl alpha-chloroacrylate, vinylethinyl carbinols, and N-vinylcarbazole. These compounds are effectively polymerized either alone or in various combinations of two, three, or even more selected monomers. In addition, other monomeric ethylenic compounds, which either fail to polymerize or polymerize only with difficulty in the presence of oxygen-liberating catalysts, can be employed as interpolymerizable modifiers to bring about the production of many valuable products. As modifiers of this type may be mentioned fumaric esters, maleic esters, mesaconic esters, citroconic esters, N-vinylmaleimides, olefin hydrocarbons such as isobutylene, and trichloroethylene. 1,3-dienes such as butadiene, isoprene, 2-chloro-1,3-butadiene, alpha-cyanoprene and 2-phenyl butadiene can also be employed in small proportions as copolymerizable modifiers. As mentioned above, the selection of a particular combination of monomers for copolymerization depends to a considerable extent on the properties desired in the polymeric product. In addition, it is well known that the polymerization tendencies of individual monomeric compounds are often markedly influenced by the presence of other monomers in the same polymerization system. This factor must also be taken into account since it is usually preferred to utilize materials that polymerize at the same or at nearly the same rates.

In preparing copolymers according to this invention, the proportions of the individual components of the monomer mixture may be varied widely. However, in binary mixtures for example, it is generally preferable to employ at least 5% by weight of any specific monomer with a corresponding amount of the other. Smaller proportions can be employed, but practically speaking, 5% is about the smallest quantity capable of bringing about appreciable modification of the polymeric product.

Although in the foregoing examples certain definite conditions of temperature, pressure, monomer-water ratios, catalyst concentrations, dispersing agent concentrations and the like have been referred to, it is to be understood that these values can be varied within the limits of this invention without departing from the spirit and scope thereof. It should be emphasized, however, that the selection of specific conditions within the limits of the invention for the polymerization of any monomer or combination of monomers is governed to a considerable extent by the properties peculiar to the individual monomers or combinations and by the properties desired in the polymeric product.

In the preferred procedure of this invention, the conversion of polymerizable ethylenic compounds to polymeric products is accomplished in aqueous dispersion. The relative proportions of monomer phase and aqueous phase are not necessarily fixed within rigid limits. However, practically speaking, it is preferable to utilize mixtures in which the ratio of the aqueous to the non-aqueous phase is varied between approximately 10:1 and approximately 1:1. In large scale operations, ratios between 4:1 and 1:1 will be found particularly suitable. The selection of a particular ratio will depend to a considerable extent on the thermal nature of the polymerization reaction, larger proportions of water serving to dissipate to a considerable extent the heat generated in vigorous reactions. On the other hand, it is desirable to use the highest proportion of monomer possible in the reaction systems of the invention in order to utilize to best advantage the production capacity of a given piece of equipment.

It is within the scope of the invention to employ monomer dispersions in water produced merely by agitation during the polymerization period. On the other hand, the formation of more or less stable dispersions can be accomplished readily through the agency of added dispersing agents. The choice of a dispersing agent will depend very largely on the properties of the monomers to be polymerized or the pH of the aqueous medium. For example, the invention contemplates conducting the polymerization of ethylenic monomers in neutral, acid or alkaline aqueous medium. In neutral dispersions, we may employ neutral dispersing agents of the type representated by polyvinyl alcohol, agar-agar, gelatin, methylated starch, sodium polymethacrylate, or the modified polymeric dispersing agents derived from ethylene oxide. In alkaline media, it is preferable to use dispersing agents of the type represented by alkali metal or amine soaps of long chain fatty acids, for example, sodium oleate, potassium laurate, or triethanolamine stearate. In acid media, it is essential to employ dispersing agents that are not decomposed at pH values below 7. The preferred agents are the synthetic dispersants comprising the soluble salts of long chain alkyl sulfates and sulfonates. Examples of this class are sodium cetyl sulfate, the sodium salt of sulfonated paraffin white oil, and the sodium salt of sulfonated oleyl acetate. A wide variety of other dispersing agents falling within this broad class are also suitable for use in emulsifying the monomers of the invention in acid media. Hence by selecting appropriate dispersing agents, the process of the invention can be conducted at pH values ranging from 1 to about 11. In the case of many vinyl monomers, however, it is preferable to use pH values in the range of about 3 to 5 and a dispersing agent which is stable under these conditions of mild acidity.

An important feature of this invention involves the use of a novel catalyst system comprising an oxygen-liberating compound of the type generally recognized as effective in vinyl polymerizations and an oxidizable oxygen-bearing sulfur compound. As typical catalysts may be mentioned hydrogen peroxide, benzoyl peroxide, percarbonates, perborates, diethyl peroxide, and soluble salts of perdisulfuric acid. As oxidizable oxygen-bearing sulfur compounds may be mentioned the inorganic oxidizable sulfoxy compounds, sulfur dioxide, sodium bisulfite, sodium sulfite, ammonium bisulfite, sodium hydrosulfite, and sodium thiosulfate, and the organic oxidizable sulfoxy compounds, p-toluene sulfinic acids, formamidine sulfinic acids, condensation products of aldehydes with alkali metal bisulfites or hydrosulfites, and dialkyl sulfites and a wide variety of other materials representing modifications and variations of these compounds.

Generally speaking, the amount of catalyst employed in a specific polymerization, including copolymerization, may be varied from about 0.01% to 5% based on the total weight of the monomers employed. The amount actually used in any specific polymerization will, of course, depend on the polymerization aptitude of the monomer, polymerization temperature, and other factors which have an important bearing on the course of the reaction. In general, it is preferred to utilize the least amount of catalyst that will bring about a satisfactory rate of polymerization in a given type of equipment. For practical purposes, an amount between about 0.1% and 4% based on the weight of the monomer is conveniently employed. Similarly the oxidizable sulfur-containing adjuvant can be added in amounts ranging from 0.001% to 5% of the quantity of monomer. The adjuvant must, therefore, be water-soluble to the extent of at least 0.002% of its weight in water under the conditions of reaction. It should be emphasized, however, that the relative amounts of both catalyst and modifier have an important bearing on the rate of polymerization of the monomers coming within the scope of the invention and in almost every case this ratio must be carefully adjusted for maximum efficiency. In general, the preferred proportion of oxidizable sulfur-containing adjuvant will be in the neighborhood of 0.05 to 0.5% based on the monomer, the ratio of catalyst to adjuvant being adjusted to values between 1:1 and 5:1. Frequently the addition of the adjuvant to the reaction mixture all at once is attended by a vigorous reaction as evidenced by a sharp increase in temperature, and in such cases, the sulfoxy compound may be added portionwise to the reaction mixture during the course of the polymerization to prevent the occurrence of such undesirable fluctuations in temperature.

Generally speaking, the use of combination catalysts as described in the preceding paragraph for the polymerization, including copolymerization, of monomers coming within the scope of the invention, represents an outstanding advance over older methods described in the prior art. For example, vinyl polymerizations are ordinarily conducted at temperatures within the range from about 30° to about 100°. It is essential to employ temperatures in this range to bring about a sufficiently rapid reaction for practical, large scale operations. At the same time, substantial amounts of catalyst are required to accomplish complete polymerization within a reasonable length of time. By using the improved catalyst combinations of this invention, these conventional polymerizations can be carried out successfully in a much shorter time with smaller actual proportions of active catalyst. For example, in the case of acrylonitrile or vinyl chloride, polymerizations that require 4 to 20 hours according to prior art methods can be accomplished within 15 minutes to 1 hour under exactly the same conditions. This represents an important saving through increasing several-fold the amount of product that can be manufactured in a single unit of equipment within a given period of time. On the other hand, many copolymer systems react with difficulty according to the methods of the prior art. The present invention not only provides a technique for conducting familiar copolymerizations at an extremely rapid rate, but also facilitates the polymerization of these more refractory systems at a practical rate. Finally, even the best catalysts known in the art will seldom bring about polymerization of any system at temperatures much below 30° C. within a reasonable length of time. As will be noted in the examples, the catalyst-sulfoxy adjuvant combinations of the invention facilitate the polymerization of many types of monomers at temperatures as low as 0 to 4° C. The discovery of this improved polymerization system hence makes possible the production of a wider variety of polymers and interpolymers from known systems since the molecular weight, viscosity, solubility characteristics, toughness, and strength, are markedly influenced by the polymerization conditions. In particular, it should be pointed out that polymerizations conducted at very low temperatures bring about the formation of unusually high molecular weight polymers, heretofore unknown or produced only by laborious and inefficient methods. Broadly speaking, the polymerizations of this invention may be conducted at temperatures ranging from just about the freezing point of the dispersions to temperatures of 120° to 125° and above, provided suitable adjustments are made in the aqueous/monomer ratio, the concentration of dispersing agent, and the concentration of catalyst and adjuvant.

In conducting the polymerization of ethylenic compounds in aqueous dispersions according to methods of the prior art, it often happens that the presence of oxygen may have a retarding effect on the speed of polymerization. The effect of oxygen is minimized to a considerable extent in the process of the present invention, although in some cases it is desirable to displace air from the polymerization vessel by means of an inert gas such as nitrogen, carbon dioxide, methane or helium. The air may be removed by a simple flushing process or by repeatedly introducing the inert gas under pressure and purging until the last traces of oxygen originally present are substantially eliminated.

The process of the invention is not limited to any particular type of apparatus. It is important, however, that the reaction vessel be constructed of metals that have no effect on the rate of polymerization or the quality of the products. It is also important that the reaction vessel be constructed of materials which are not attacked by the aqueous medium employed in carrying out the polymerization. Generally speaking, metals such as stainless steel, nickel, silver, and lead can be employed. Similarly, vessels equipped with glass or enamel liners can also be used.

In the polymerization, including copolymerization, of monomers coming within the scope of the invention, it is often convenient to carry out the reaction by a simple batch-wise procedure in which the monomers and aqueous dispersing system are added simultaneously to the polymerization vessel. This technique is particularly adapted to the production of polymers, including copolymers, which form without the undue liberation of heat and which polymerize at even rates. On the other hand, individual monomers of certain copolymer systems are known to polymerize at sufficiently different rates as to bring about the formation of undesirable non-homogeneous products. In such cases it is often desired to add the monomer which polymerizes at the more rapid rate in successive portions to an aqueous dispersion of the monomer that polymerizes at the slower rate. In view of the unusually rapid polymerizations realized through the use of the combination catalysts of the invention, the polymerization of many systems may be accomplished smoothly in a continuous manner. Here again, the portionwise addition of catalyst, modifying agent, or one of the monomers can be employed to iron out temperature fluctuations and to bring about the formation of more homogeneous products.

Depending on the conditions employed in the polymerization, including copolymerization, of monomers, the products of the invention are obtained either as dispersions in water or as finely divided suspensions. In either case, the polymers may be isolated as finely divided powders by a variety of methods. For example, polymers prepared in the absence of added dispersing agent may be recovered by a simple filtration process followed by washing and drying in appropriate equipment. On the other hand, if effective dispersing agents are employed, the resulting permanent dispersions can be coagulated by freezing, by the addition of suitable electrolytes, or by spraying the dispersion into a heated and/or evacuated chamber. Generally speaking, the most satisfactory technique involves adding an appropriate amount of an electrolyte to bring about the coagulation of the polymer at a temperature just below the point where the precipitated polymers tend to cohere. This procedure yields a granular product which is readily washed. Suitable electrolytes are sodium chloride, sodium sulfate, mineral acids, calcium chloride, inorganic nitrates, and aluminum sulfate. The washing and drying operations may be carried out by any of the procedures known to the art.

The products prepared according to the present invention may be used in molded plastics, coatings, films, foils, fibers and adhesives. For any of these purposes the polymer may be combined with or prepared in the presence of plasticizers, stabilizers, fillers, pigments, dyes, softeners, natural resins or other synthetic resins. In event the products are to be used as coatings or impregnating agents for porous materials, it is often practical to apply the emulsion directly to the material to be coated without the intermediate isolation of the polymer.

Having described in detail the preferred embodiments of the invention it is to be understood that we do not limit ourselves to the specific embodiments thereof, except as described in the following claims.

We claim:

1. The process for preparing resinous material through polymerization which comprises forming an aqueous dispersion containing a monoethylenically - unsaturated, polymerizable, organic compound having a terminal ethylenic double bond and molecular weight in excess of 30, said aqueous medium containing from about .01% to 5%, based on the total weight of monomers present, of an oxygen-yielding polymerization catalyst and from about .001% to 5%, based on the quantity of monomer, of an inorganic oxidizable sulfoxy compound from the group consisting of sulfur dioxide, sodium bisulfite, sodium sulfite, ammonium bisulfite, sodium hydrosulfite, and sodium thiosulfate, and then maintaining the resulting dispersion at a temperature of from 0° C. to 125° C. until polymerization of the polymerizable components present therein is essentially complete.

2. The process in accordance with claim 1 characterized in that the oxygen-yielding polymerization catalyst is the ammonium salt of perdisulfuric acid.

3. The process in accordance with claim 1 characterized in that the oxidizable sulfoxy compound is sodium bisulfite.

4. The process for preparing resinous materials through polymerization which comprises forming an aqueous dispersion containing a monoethylenically-unsaturated polymerizable organic compound having a terminal ethylenic double bond and a molecular weight in excess of 30, said aqueous medium containing .1% to 4%, based on the total weight of monomer present, of an oxygen-yielding polymerization catalyst, from about .05% to 5%, based on the quantity of monomer present, of an inorganic oxidizable sulfoxy compound from the group consisting of sulfur dioxide, sodium bisulfite, sodium sulfite, ammonium bisulfite, sodium hydrosulfite, and sodium thiosulfate, and a dispersing agent, and then maintaining the resulting dispersion at a temperature of from 30° C. to 100° C. until polymerization of the polymerizable components present therein is essentially complete.

5. The process in accordance with claim 4 characterized in that the dispersing agent contains as its main active ingredient a sodium salt of a sulfonated paraffin white oil.

6. The process in accordance with claim 4 characterized in that the dispersing agent contains as its main active ingredient sodium cetyl sulfate.

7. A process for producing resinous polymerization products which comprises forming an aqueous dispersion containing a polymerizable monoethylenically - unsaturated organic compound having a terminal ethylenic double bond and a molecular weight in excess of 30, from about 0.1% to 5% of an oxygen-yielding polymerization catalyst, from about .001% to 5% of an inorganic oxidizable sulfoxy compound from the group consisting of sulfur dioxide, sodium bisulfite, sodium sulfite, ammonium bisulfite, sodium hydrosulfite, and sodium thiosulfate, and from about 1% to 5% of a dispersing agent, said percentage amounts being based upon the total weight of monomers present in the dispersion, and then maintaining the resulting dispersion at a temperature of from 30° C. to 100° C. until polymerization of the polymerizable components present is essentially complete.

8. The process for preparing resinous materials through polymerization which comprises forming an aqueous dispersion containing a polymerizable monoethylenically-unsaturated hydrocarbon in which the ethylenic double bond is terminal and which has a molecular weight in excess of 30, said aqueous medium containing from about .1% to 4%, based on the total weight of monomer present, of an oxygen-yielding catalyst and from about .05% to 5%, based on the quantity of monomer, of an inorganic oxidizable sulfoxy compound from the group consisting of sulfur dioxide, sodium bisulfite, sodium sulfite, ammonium bisulfite, sodium hydrosulfite, and sodium thiosulfate, and then maintaining the resulting dispersion at a temperature of from 30° C. to 100° C. until polymerization of the polymerizable components present therein is essentially complete.

9. The process in accordance with claim 8 characterized in that the monoethylenic hydrocarbon is styrene.

10. The process for preparing resinous materials through polymerization which comprises forming an aqueous dispersion containing a vinyl ester of a saturated monocarboxylic acid, said aqueous medium containing .1% to 4%, based on the total weight of monomer present, of an oxygen-yielding polymerization catalyst and .05% to 5%, based on the quantity of monomer, of an inorganic oxidizable sulfoxy compound from the group consisting of sulfur dioxide, sodium bisulfate, sodium sulfite, ammonium bisulfite, sodium hydrosulfite, and sodium thiosulfate, and a dispersing agent, and then maintaining the resulting dispersion at a temperature of from 30° C. to 100° C. until polymerization of the polymerizable components present therein is substantially complete.

11. A process for polymerizing a vinyl ester of a saturated monocarboxylic acid to obtain a resinous product which comprises forming an aqueous dispersion containing said ester, together with from 1% to 5% of sodium cetyl sulfate as a dispersing agent, from 0.1% to 2% of ammonium perdisulfate as a polymerization catalyst, and from 0.05% to 0.5% of sodium bisulfite as an adjuvant, said percentage amounts being based on the total weight of the monomer present in the dispersion, and then heating the resulting dispersion at a temperature ranging from about 30–100° C. to effect polymerization of said ester.

12. A process for polymerizing vinyl acetate to obtain a resinous product which comprises forming an aqueous dispersion containing vinyl acetate, together with from 0.1% to 4% of ammonium perdisulfate as a polymerization catalyst and from .05% to 5% of sodium bisulfite as an adjuvant, said percentage amounts being based on the total weight of the monomer present in the dispersion, and then heating the resulting dispersion at a temperature ranging from about 30° to 100° C. to effect polymerization of said vinyl acetate.

13. A process for polymerizing vinyl acetate to obtain a resinous product which comprises forming an aqueous dispersion containing vinyl acetate, together with from 0.1% to 4% of a water-soluble salt of perdisulfuric acid as a polymerization catalyst, and from .05% to 5% of sodium bisulfite as an adjuvant, said percentage amounts being based on the total weight of the monomer present in the dispersion, and then heating the resulting dispersion at a temperature ranging from about 30° to 100° C. to effect polymerization of said vinyl acetate.

14. A process for polymerizing vinyl acetate to obtain a resinous product which comprises forming an aqueous dispersion containing vinyl acetate, together with from 1% to 5% of a dispersing agent, from 0.1% to 4% of a water-soluble salt of perdisulfuric acid as a polymerization catalyst, and from .05% to 5% of sodium bisulfite as an adjuvant, said percentage amounts being based on the total weight of the monomer present in the dispersion, and then heating the resulting dispersion at a temperature ranging from about 30° to 100° C. to effect polymerization of said vinyl acetate.

15. A process for polymerizing vinyl acetate to obtain a resinous product which comprises forming an aqueous dispersion containing vinyl acetate, together with from 0.1% to 4% of a water-soluble salt of perdisulfuric acid as a polymerization catalyst, and from .05% to 5% of an inorganic oxidizable sulfoxy compound from the group consisting of sulfur dioxide, sodium bisulfite, sodium sulfite, ammonium bisulfite, sodium hydrosulfite and sodium thiosulfate as an adjuvant, said percentage amounts being based on the total weight of the monomer present in the dispersion, and then heating the resulting dispersion at a temperature ranging from about 30° to 100° C. to effect polymerization of said vinyl acetate.

16. A process for polymerizing vinyl acetate which consists in forming an aqueous dispersion of vinyl acetate that contains 1%, based on the weight of the monomer present, of ammonium perdisulfate as a polymerization catalyst, ⅓ of 1%, based on the weight of monomer present, of sodium bisulfite as adjuvant, and a dispersing agent, said dispersing agent containing as its main active ingredient sodium cetyl sulfate, and then heating the resultant dispersion at a temperature within the range of from about 30° C. to 100° C. to effect polymerization of said vinyl acetate.

17. The process in accordance with claim 1 characterized in that the oxygen-yielding polymerization catalyst is a water-soluble salt of perdisulfuric acid.

MERLIN M. BRUBAKER.
RALPH A. JACOBSON.

REFERENCES CITED

The following references are of record in the file of this patent:

UNITED STATES PATENTS

| Number | Name | Date |
|---|---|---|
| 2,125,649 | Reppe et al. | Aug. 2, 1938 |
| 2,231,905 | Hanford | Feb. 18, 1941 |
| 2,264,173 | Collins | Nov. 25, 1941 |
| 2,264,376 | Hiltner et al. | Dec. 2, 1941 |
| 2,271,384 | Arnold | Jan. 27, 1942 |
| 2,284,280 | Habgood et al. | May 26, 1942 |
| 2,286,264 | Crawford et al. | June 16, 1942 |
| 2,300,920 | Heuer | Nov. 2, 1942 |
| 2,356,925 | Fryling | Aug. 29, 1944 |

FOREIGN PATENTS

| Number | Country | Date |
|---|---|---|
| 514,912 | Great Britain | Nov. 21, 1939 |